March 22, 1927.
C. H. LINN
1,622,200
SHOCK ABSORBER AND SNUBBER COMBINED
Filed Jan. 27, 1926
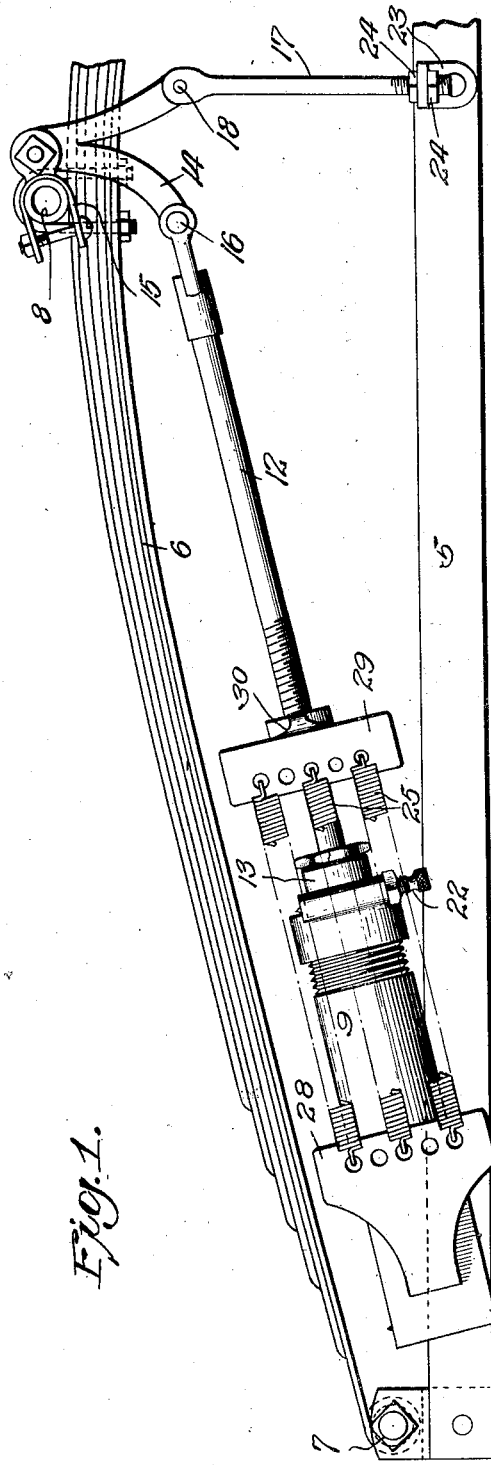
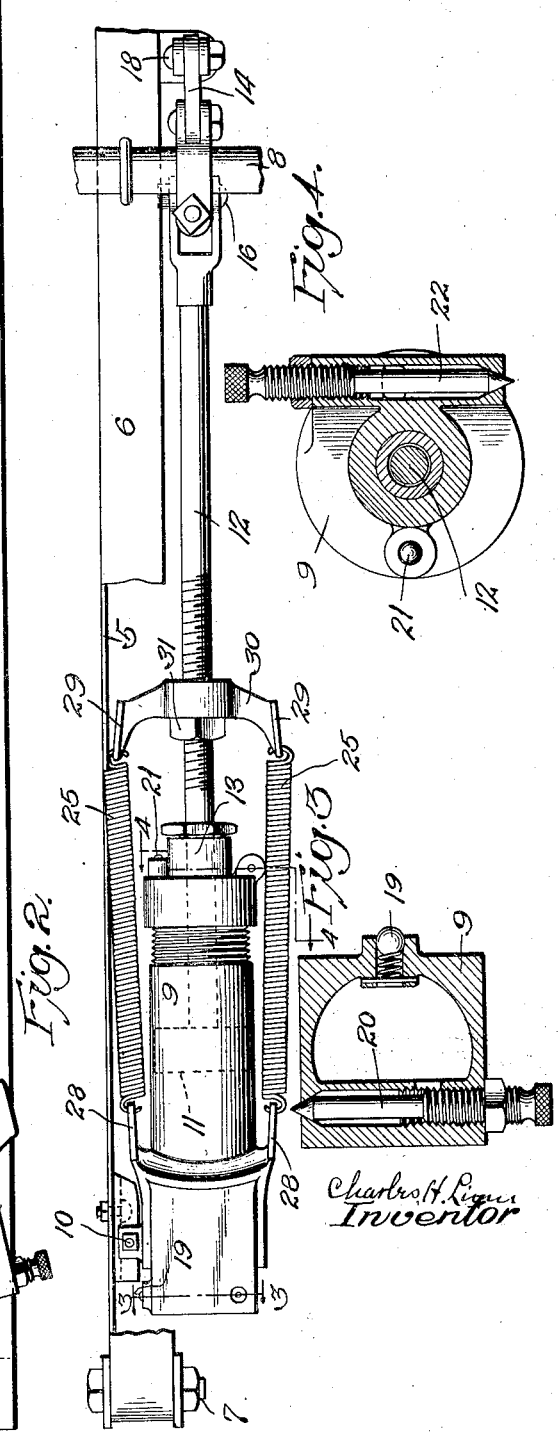
Charles H. Linn
Inventor Patented Mar. 22, 1927.

1,622,200

UNITED STATES PATENT OFFICE.

CHARLES H. LINN, OF OAKLAND, CALIFORNIA.

SHOCK ABSORBER AND SNUBBER COMBINED.

Application filed January 27, 1926. Serial No. 84,249.

This invention relates to a combined shock absorber and snubber, and has more particular reference to a device of this kind adapted for use upon motor vehicles to prevent excessive movement of the vehicle body relative to the vehicle axles.

The primary object of the invention is to provide a combined shock absorber and snubber which is simple in construction and cheap to manufacture, which is capable of being readily placed into practical use, which is efficient and durable in operation, and which will materially increase the comfort of riding.

Another object is to provide an improved shock absorber which will yieldingly resist undue movement of the vehicle body relative to the axle and thereby relieve the vehicle springs of excessive stresses and strains.

Another object is to provide a snubber for effectively cushioning the rebounding of a vehicle body wherein the body and axles undergo a relative movement toward each other.

A still further object is to provide an improved combined shock absorber and snubber for yieldingly resisting undue movement of the vehicle body relative to the axle, and wherein resistance is offered to the movement of the body and axle away from each other and a greater resistance offered to their relative movement toward each other as occurs during the rebound.

With the above general objects in view, and others that will become apparent as the nature of the invention is better understood, the same consists in the novel form, combination and arrangement of parts hereinafter more fully described, shown in the accompanying drawing and claimed.

In the drawing, wherein like reference characters indicate corresponding parts throughout the several views, Figure 1 is an inverted fragmentary side elevational view showing a combined shock absorber and snubber constructed in accordance with the present invention and operatively associated with a vehicle spring, axle and side chassis rail;

Figure 2 is a view in plan looking downwardly on the structure of Figure 1 with the vehicle spring partly broken away to reveal other parts;

Figure 3 is an enlarged transverse sectional view taken upon line 3—3 of Figure 2; and Figure 4 is an enlarged transverse section taken substantially upon line 4—4 of Figure 2.

Referring more in detail to the drawing, 5 indicates the side rail of a vehicle chassis frame, and 6 indicates the usual vehicle leaf spring arranged longitudinally of and beneath the rail 5 with the forward ends of the rail and spring connected in the usual manner as indicated at 7, and with the usual axle 8 rigidly connected to the intermediate portion of the leaf spring in the usual manner.

The present invention embodies a double acting pneumatic resistance device including a cylinder or barrel 9 rigidly attached at its outer end to the side chassis rail 5 by means of a suitable bracket as generally indicated at 10, adjacent to the point of connection 7 between the chassis rail and the leaf spring 6. The opposite ends of the cylinder or barrel 9 are provided with air intake and adjustable air exhaust valves as will be presently described, and working within the cylinder or barrel 9 is a piston 11 fixed to the inner end of a piston rod 12 slidable longitudinally through a suitable packing gland 13 provided for the inner end of the cylinder or barrel 9.

A bell crank lever 14 is pivotally connected to the intermediate portion of the leaf spring 6, such as by being pivoted to a suitable bracket clipped on the axle 8 as at 15, and the end of one arm of the bell crank lever 14 is pivotally attached to the outer end of the piston rod 12 as at 16. A depending rod 17 is fixed at its upper end to the side rail 5 and has its lower end pivotally attached as at 18 to the adjacent end of the other arm of the bell crank lever 14, and it is thus apparent that when the rail 5 and spring 6 move so as to cause the rail 5 and axle 8 to move toward each other the rod 17 will cause the bell crank lever 14 to swing in a direction for pulling outwardly upon the piston rod 12 and moving the piston 11 toward the inner end of the cylinder or barrel 9. On the other hand, by reason of this construction, it will be apparent that upon separating movement between the axle 8 and rail 5, the rod 17 will exert a pull upon the bell crank lever 14 for swinging the latter in the opposite direction and pushing upon the piston rod 12 to move the piston 11 toward the outer end of the cylinder or barrel 9. In either operation the relative movement between the axle and the side rail will be yieldingly resisted by the air cushion in the active end of the cylinder or barrel, such air being admitted and allowed to slowly exhaust to suit conditions, in a manner which will now be described, for effectively absorbing shock. As shown clearly in Figure 3 the outer end of cylinder or barrel 9 is equipped with a spring seated and outwardly seating ball check valve 19 controlling an air intake port, and a manually adjustable needle valve 20 controlling an air exhaust port. In a like manner, the inner end of the cylinder is equipped with a spring seated and outwardly seating ball check valve 21 controlling an air intake port and a manually adjustable needle valve 22 controlling an exhaust port.

In applying the present invention to a motor vehicle the parts are adapted to be adjusted so that the piston 11 is normally midway between the ends of the cylinder or barrel 9 as indicated by dotted lines in Figure 2, and in order to provide an adjustment for insuring this normal position of the piston, the rod 17 is attached to the rail 5 so as to be vertically adjustable. As shown, this adjustment is obtained by providing the rail 5 with a rigid angle bracket 23 having a horizontal arm provided with an aperture through which the rod 17 is freely slidable at its upper end, the upper end portion of the rod 17 being suitably threaded to receive jamb nuts 24 at opposite sides of the horizontal arm of bracket 23. By reason of this construction it is readily apparent that the rod 17 may be longitudinally vertically adjusted by backing away one of the jamb nuts and taking up upon the other or vice versa. It is accordingly apparent that in this way the piston rod 12 may be correspondingly adjusted so as to center the piston 11 between the ends of the cylinder 9 when the spring 6 is under normal load.

In the operation of the construction, thus far described, the axle 8 will be caused to approach the rail 5 when the wheels of the vehicle strike an obstruction or inequality of the road surface, and when this takes place the leaf spring 6 will be flexed and the rod 17 will simultaneously rock bell crank lever 14 for pulling outwardly upon the piston rod 12 and causing the piston 11 to move toward the inner or right hand end of the cylinder as viewed in Fig. 1. The air which has been previously drawn into this end of the cylinder through the air inlet port controlled by valve 21 will accordingly be compressed and, by reason of the previous adjustment of needle valve 22 will be allowed to slowly exhaust or pass out of this end of the cylinder. This air cushion will naturally effectively absorb the shock incident to striking the obstruction or inequality of the road surface. After the above operation takes place a separation of the axle and rail 5 will be experienced due to rebound of the spring 6, and the rod 7 will exert a pull upon the bell crank lever for swinging the latter in a direction to cause the piston rod 12 to be pushed and to thereby force the plunger 11 toward the outer end of cylinder 9. When this latter operation takes place the movement of the piston is resisted by the air cushion in the outer end of the cylinder 9 provided by the air which has previously entered through the port controlled by valve 19, such air being allowed to slowly escape through the exhaust port controlled by the previously adjusted needle valve 20. Obviously, the needle valves 20 and 22 may be adjusted to vary the escape of air to provide a pneumatic resistance of the desired character in accordance with the circumstances met with in using the invention upon different types of automobiles.

The rebounding action above mentioned is usually very violent and accordingly causes considerable jolting and discomfort to the occupants of a vehicle. In order to effectively absorb the shocks and to offer additional resistance to the return movement after the separating movement of the body or rail 5 and the axle 8, I provide a snubbing means composed of a plurality of helical tension springs 25 disposed in spaced parallel relation at each side of the cylinder 9 and having their ends respectively connected with bracket plates 28 rigid with the opposite sides of the outer end portion of cylinder 9 and with bracket plates 29 rigid with the ends of a cross bar 30 adjustably mounted upon the intermediate portion of the piston rod 12, whereby said springs 25 will cooperate with the air cushion provided for at the inner end of the cylinder 9 for resisting the relative movement of the axle and body or chassis rail 5 toward each other. Naturally, these springs 25 will be adjusted to act against and relieve the leaf spring 5 sufficiently to return the piston 11 to its normal position midway between the ends of the cylinder so that they will only be placed under additional tension when the piston moves from such midway position toward the inner end of the cylinder. For obtaining this adjustment the cross bar 30 is slidably mounted on the piston rod 12 and engages at its inner side with a stop nut 31 adjustably threaded upon the intermediate portion of the rod 12 as shown. As shown, the bracket plates 28 and 29 are provided with series of apertures in which are engaged hooks formed on the ends of the springs 25 so that the latter are effectively attached.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. A flexible suspension system for vehicles, comprising a bell crank lever, means to pivotally attach said bell crank lever to the axle of the vehicle, a double acting pneumatic resistance device embodying a part adapted to be fixed to the vehicle frame and a movable part attached to one arm of said bell crank lever, and means to connect the other arm of said bell crank lever to the vehicle frame.

2. A device like that set forth in claim 1, wherein said last named means comprises a rod vertically adjustable relative to the frame, and wherein said pneumatic resistance device embodies a cylinder having a piston movable therein, and adapted to be normally centered between the ends of the cylinder by the adjustment of said rod relative to the vehicle frame.

3. A device like that set forth in claim 1, wherein elastic tension means is provided between the fixed and movable parts of the pneumatic resistance device for additionally resisting movement of the vehicle axle and vehicle frame toward each other.

4. A flexible suspension system for vehicles, comprising a bell crank lever, means to pivotally attach said bell crank lever to the axle of the vehicle, a double acting pneumatic resistance device embodying a part adapted to be fixed to the vehicle frame and a movable part attached to one arm of said bell crank lever, means to connect the other arm of said bell crank lever to the vehicle frame, said pneumatic resistance device embodying a cylinder constituting said fixed part, and a piston movable in the cylinder and having a rigid rod constituting the movable part, a plurality of helical tension springs disposed longitudinally of and at opposite sides of said cylinders, a cross bar adjustable longitudinally of the piston rod, and bracket plates rigid with the cylinder and cross bar and respectively having the opposite ends of the springs connected thereto whereby said springs may offer additional resistance to movement of the vehicle frame and vehicle axle toward each other.

5. A combined shock absorber and snubber attachment for vehicles comprising a double acting pneumatic resistance device having a cylinder and piston carrying rod, means to fix the cylinder to a vehicle frame, a bell crank lever, means to pivotally attach the bell crank lever to a vehicle axle, means to pivotally attach one arm of the bell crank lever to the piston rod, and means to adjustably connect the other arm of the bell crank lever to the vehicle frame, and spring means operatively connecting the cylinder and the piston rod for resisting movement of the piston in one direction.

6. A combined shock absorber and snubber attachment for vehicles comprising a double acting pneumatic resistance device having a cylinder and piston carrying rod, means to fix the cylinder to a vehicle frame, a bell crank lever, means to pivotally attach the bell crank lever to a vehicle axle, means to pivotally attach one arm of the bell crank lever to the piston rod, and means to adjustably connect the other arm of the bell crank lever to the vehicle frame, and spring means operatively connecting the cylinder and the piston rod for resisting movement of the piston in one direction, said last named spring means comprising elastic tension devices disposed at opposite sides of the cylinder exteriorly of the latter.

7. A combined shock absorber and snubber attachment for vehicles comprising a double acting pneumatic resistance device having a cylinder and piston carrying rod, means to fix the cylinder to a vehicle frame, a bell crank lever, means to pivotally attach the bell crank lever to a vehicle axle, means to pivotally attach one arm of the bell crank lever to the piston rod, and means to adjustably connect the other arm of the bell crank lever to the vehicle frame, and spring means operatively connecting the cylinder and the piston rod for resisting movement of the piston in one direction, said last named spring means comprising elastic tension devices disposed at opposite sides of the cylinder exteriorly of the latter, said elastic tension devices comprising bracket plates respectively rigid with the cylinder and adjustable longitudinally of the piston rod, and tension springs operatively connecting said bracket plates.

CHARLES H. LINN.